United States Patent [19]

Traut

[11] 3,989,324
[45] Nov. 2, 1976

[54] ROLLING CONTACT BEARINGS

[76] Inventor: Earl W. Traut, P.O. Box 23776, Fort Lauderdale, Fla. 33307

[22] Filed: Oct. 2, 1974

[21] Appl. No.: 511,237

[52] U.S. Cl. .............................. 308/200; 308/202; 308/205
[51] Int. Cl.² ........................................ F16C 19/20
[58] Field of Search .................................. 308/200

[56] References Cited
UNITED STATES PATENTS

| | | | |
|---|---|---|---|
| 1,001,764 | 8/1911 | Linn | 308/200 |
| 1,121,087 | 12/1914 | Golly | 308/200 |
| 2,151,830 | 3/1939 | Bruhl | 308/200 |

Primary Examiner—M. H. Wood, Jr.
Assistant Examiner—Richard A. Bertsch

[57] ABSTRACT

Basic mechanisms avoiding sliding friction and comprised of two races surrounding two series of rotating elements which are alternately interposed between each other in rolling contact; each series additionally being in rolling contact with one of the races. The races and rotating elements may be lineally arranged; or, if circularly disposed, may be oriented either axially or radially with respect to the rotational axis of the mechanism.

To obtain useful bearings from these mechanisms a third race is added, loads being transferred from the third race through one of the series of rotating elements to one of the other races; or, all rotating elements and races may share the load. Radial-load and axial-load bearings are described; several means being used to assure that no sliding friction is present.

12 Claims, 15 Drawing Figures

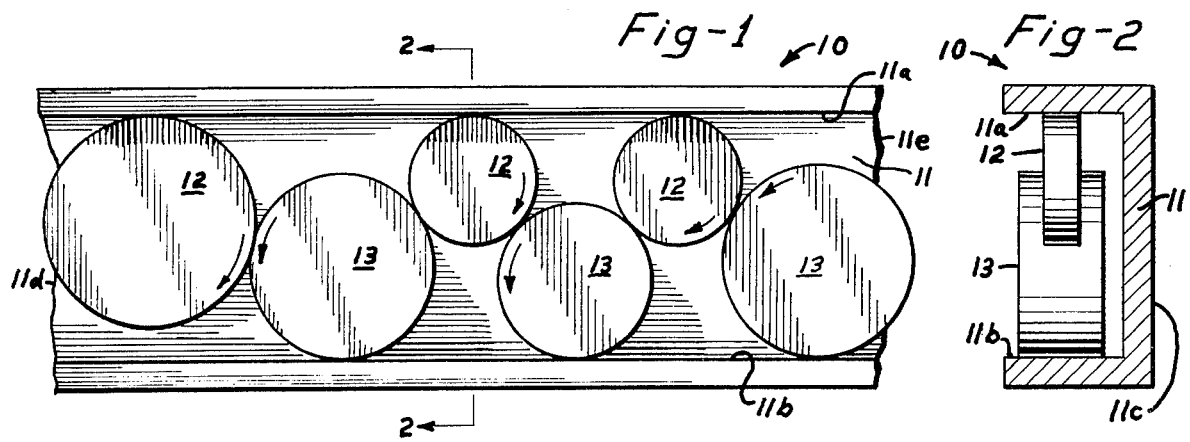
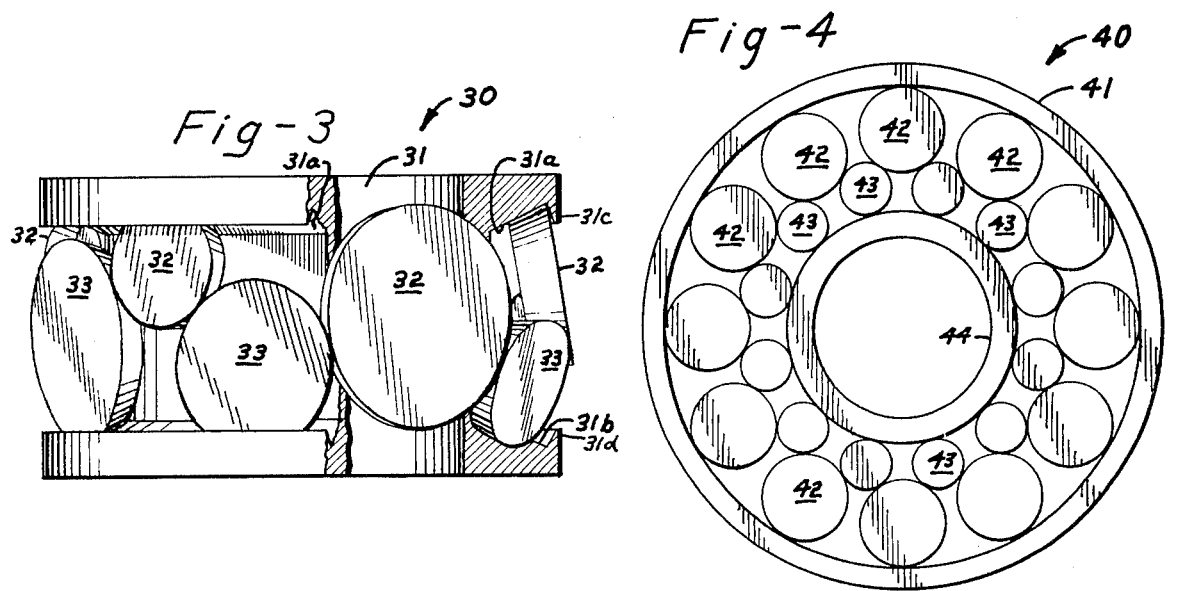
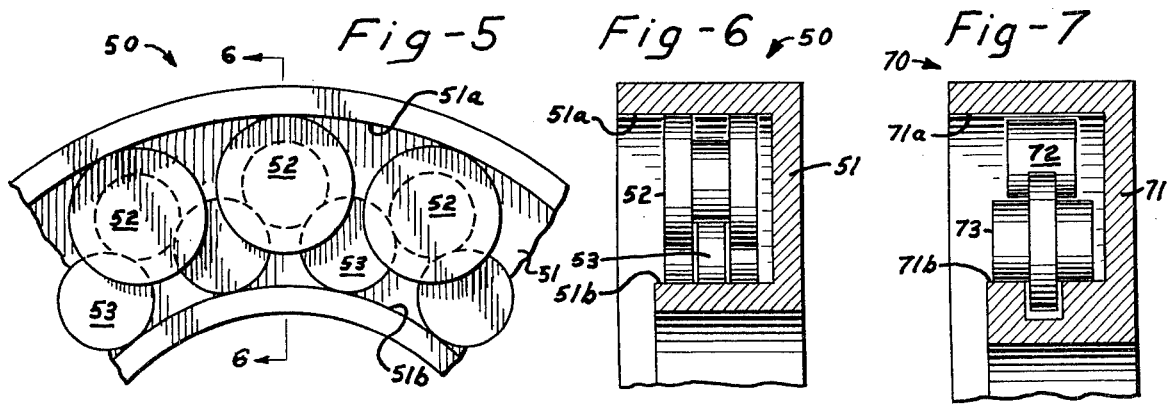

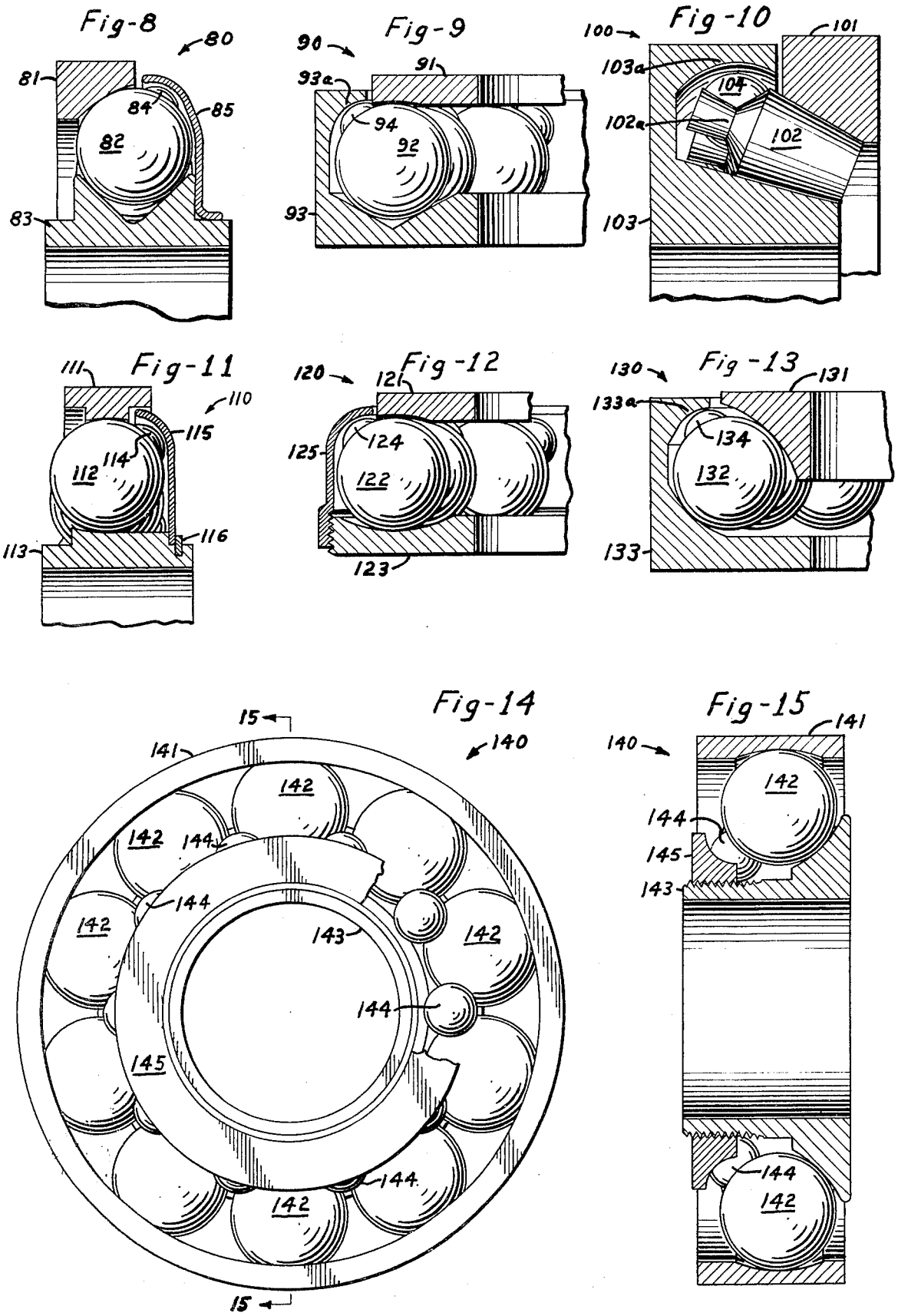

ROLLING CONTACT BEARINGS

BACKGROUND OF THE INVENTION

In typical ball or roller bearings the rotating elements slide against each other or slide against a cage. This sliding friction causes heat and wear, and necessitates providing clearances and lubrication in the bearing. Several previous U.S. Patents propose bearing devices which avoid sliding friction, but these are excessively complex, too expensive to manufacture, incur a high speed problem, require impossibly close manufacturing tolerances, or are impractical for other reasons. Most of the previously proposed bearings are based upon or related to the basic mechanisms described herein, as are those in my earlier patent applications, Ser. No. 414,150 of Nov. 9, 1973 entitled Rolling Contact Bearing Devices, U.S. Pat. No. 3,937,536, and Ser. No. 424,553 of Dec. 13, 1973 entitled Rolling Contact Devices U.S. Pat. No. 3,969,005.

SUMMARY OF THE INVENTION

The invention describes a basic mechanism wherein two fixed, linear strips or parallel races are joined by a web so as to form the flanges of a U-channel, there also being two series of rotating elements located between these two races. Each of these series of rotating elements is alternately interposed between and in rolling contact with the other series. Additionally, each series of rotating elements is in rolling contact with one of the races. The rotating elements may have various diameters, and yet roll as a group between the races without sliding friction.

Rolling contact mechanisms, devices and bearings are defined as including only rolling contact in the relative movement between their components, there being no sliding friction anywhere.

The basic linear mechanism is developed into a circular, axially-oriented mechanism by joining the ends of the linear mechanism so as to obtain two coaxial, circular races of the same diameter and having two series of rotating elements located between them. These two series of rotating elements are interposed between each other and in rolling contact with each other; each series additionally being in rolling contact with one of the races. Thus, each individual rotating element will make contact at three locations; two with the adjoining rotating elements of the other series, and one with a race. There are an equal number of rotating elements in each series. Each rotating element is circular in cross-section where it contacts a race or other rotating elements.

The basic linear mechanism may be differently developed into circular, radially-oriented mechanisms by joining its ends so as to form two concentric races which face each other and have the two series of rotating elements located between them. In one of these radially-oriented mechanisms means is not provided to join the two races because there is relative motion between them. In other radially-oriented mechanisms the two races are joined together and stepped-rollers are used as one of the series of rotating elements to compensate for the difference in diameter of the two races and thus preclude relative motion between them. The stepped rollers have portions with different diameters; one diameter being in rolling contact with the other series of rotating elements, the other diameter being in rolling contact with one of the races.

These several radially-oriented mechanisms are then further developed into useful radial-load and axial-load rolling contact bearings by adding a third race. Bearing loads are passed between this third race and one of the other races through one of the series of rotating elements, just as in conventional bearings. The other series of rotating elements then serves to assure spacing between the load-bearing rotating elements and is held in position by the remaining race, which acts as a retaining race. Or, bearing loads can be passed from this third race through one of the series of rotating elements and then partially to the other series of rotating elements and to both races.

Just as in the previously described mechanisms, the rotating elements of each series are interposed between each other, each rotating element thus being in rolling contact with a race and with two adjacent rotating elements from the other series.

In each of these three-race bearings in which the diameters of contact on the two joined races are different, means are provided to avoid sliding contact. Such means may include a V-groove in one of the races or rollers of a series so that the balls of one series of rotating elements have two different contact diameters; one with which they are in contact with the adjacent rotating elements, and another with which they contact the adjacent race. Or, the balls in either or both series may be permitted to rotate around more than one axis.

Accordingly, it is an object of the present invention to describe a basic mechanism which underlies most bearing devices wherein internal sliding friction is avoided.

Another object of the invention is to reconfigure this basic mechanism into circularly arranged mechanisms which are either axially or radially oriented.

A further object of the invention is to convert these circularly arranged mechanisms into useful rolling contact bearings which have no sliding friction.

Yet another object of the invention is to provide rolling contact bearings in which lubrication is not essential.

A still further object of the invention is to provide rolling contact bearings in which there are zero clearances between elements.

Still another object of the invention is to provide rolling contact bearings which are adjustable so as to provide any desired amount of internal clearance.

A further object of the invention is to provide a bearing in which the elements may have dimensional variations, yet operate without sliding friction.

A yet further object of the invention is to provide rolling contact bearings wherein all rotating elements are simple spheres.

An additional object of the invention is to provide useful configurations of bearings in which varied means are used to preclude sliding friction.

Other objects of this invention will appear from the following description and appended claims, reference being had to the accompanying drawings forming a part of this specification wherein like reference characters designate corresponding parts in the several views.

FIG. 1 is a face view of a segment of a basic linear mechanism wherein two series of variously-sized discs rotate between the flanges of a U-channel.

FIG. 2 is a sectional view taken along line 2—2 of FIG. 1 and looking in the direction of the arrows.

FIG. 3 is a side view partially broken away to show a mechanism similar to that of FIG. 1, but in which the U-channel is in effect bent backwards until the ends are joined so as to form a circular cup-ring.

FIG. 4 is a face view of a variation of the mechanism of FIG. 1 in which the strips are bent downwards to form concentric races.

FIG. 5 is a face view of the upper portion of a variation of FIG. 4 in which stepped-rollers are used to obtain a zero speed differential between the inner and outer races so that they can be joined.

FIG. 6 is a vertical sectional view taken along line 6—6 of FIG. 5 and looking in the direction of the arrows.

FIG. 7 is a vertical sectional view of the upper portion of a mechanism similar to that of FIG. 5, but in which a different stepped-roller arrangement is used.

FIG. 8 is a vertical sectional view of the upper portion of a primarily radial-load rolling contact ball bearing based upon the mechanism of FIG. 7, but in which a third race is used as a means of introducing bearing loads, wherein balls are used instead of rollers, and in which a V-groove is used to adjust the travel distance of the balls in one of the series.

FIG. 9 is a vertical sectional view of the left portion of a rolling contact ball bearing similar to that of FIG. 8, except that it sustains axial loads.

FIG. 10 is a vertical sectional view of the upper portion of a combination radial and axial-load rolling contact roller bearing in which internal speed corrections are made by grooves at the ends of the rollers.

FIG. 11 is a vertical sectional view of the upper portion of a radial load rolling contact ball bearing in which internal speed adjustments are made simply by permitting the balls to rotate around more than one axis.

FIG. 12 is a vertical sectional view of the left end of a rolling contact ball bearing similar to that of FIG. 11, except that it accommodates axial loads.

FIG. 13 is a vertical sectional view of the left end of a rolling contact ball bearing similar to that of FIG. 12, except that the contact diameters on the two joined races are the same, and both radial and axial loads are accommodated.

FIG. 14 is a face view partially broken away of a radial-load rolling contact ball bearing in which the contact radii of the two series of rotating elements are approximately equal, and in which both series of balls carry part of the load.

FIG. 15 is a sectional view taken along line 15—15 of FIG. 14 and looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Turning now to FIGS. 1 and 2 there will be seen basic mechanism 10, wherein two series of discs of various diameters rotate in rolling-line contact between two parallel stationary races. No sliding contact is present, even though the discs are of different diameters. This is explained by the fact that when the discs rotate as an assembly, the peripheral distance traveled by each disc is the same, but the angular velocity of each disc at any point in time is inversely proportional to its diameter.

In FIGS. 1 and 2, device 10 consists of a stationary U-channel 11 of infinite length, which comprises two parallel races or flanges 11a and 11b, and web 11c. An infinite number of discs 12 comprise an upper series of discs, each of which has three lines of contact; one with upper race 11a and the other two with adjacent discs 13. Discs 13 similarly are infinite in number and comprise a lower series of discs; each similarly having three lines of contact, one with lower race 11b and the other two with adjacent discs 12. Note that discs 12 and discs 13 rotate in opposite directions. With the directions of rotation as marked in FIG. 1, all discs as an assembly would move towards the left, yet be in rolling-line contact only. This action can be simulated by similarly arranging coins of different sizes on a flat horizontal surface between parallel rulers.

It should be noted that discs 12 and 13 could just as well be infinitely thin, or could be balls; either of these arrangements producing rolling-point contact instead of rolling-line contact. Also, web 11c is not essential: races 11a and 11b may be held in position otherwise; or, the upper race would tend to maintain its stationary position even if not attached to anything.

Obviously a mechanism of infinite length is somewhat impractical, but the concept can readily be reduced to finite dimensions as in device 30 of FIG. 3. Device 30 is essentially what would be obtained by bending ends 11d and 11e of device 10 backwards so as to join them, thus producing a circular U-channel; races 11a and 11b then becoming parallel coaxial rings of equal diameter. Returning now to FIG. 3, circular U-channel 31 includes an upper series of tapered rollers 32 of various diameters which are in rolling-line contact with tapered upper race 31a and adjacent tapered rollers 33. Tapered rollers 33 similarly are in rolling-line contact with lower race 31b and adjacent tapered rollers 32. Lips 31c and 31d prevent rollers 32 and 33 from falling out.

Thus, device 30 is a three-dimensional operable device; but even so, it has limited practical value as shown. However, the axial-load devices contained in my patent applications, Ser. No. 414,150 of Nov. 9, 1973 entitled Rolling Contact Bearing Devices, U.S. Pat. No. 3,937,536, and Ser. No. 424,553 of Dec. 13, 1973 entitled Rolling Contact Devices, U.S. Pat. No. 3,969,005, are related to this concept; and so are certain devices herein later to be described.

Proceeding again from device 10 in a different manner; in device 40 of FIG. 4, web 11c of the U-channel is eliminated and the ends of races 11a and 11b of device 10 are rotated downwards and then joined so as to form two concentric rings. Comparing device 10 to device 40: flange 11a becomes outer ring 41, flange 11b becomes inner ring 44, upper discs 12 become outer discs 42, and lower discs 13 become inner discs 43. Device 40 thus can become a useful radial-load bearing in which loads are transferred from outer race 41 through discs 42, through discs 43, to inner race 44. It should be noted that all discs 42 must be identical in diameter, as must all discs 43. Also, means must be added to hold the two series of discs in the position shown. Note that discs 42 and 43 considered as a group, will rotate around the axis of device 40 considerably faster than whichever race is in motion.

The rolling-contact-only bearing of Baker in U.S. Pat. No. 116,795 of 1871 utilizes the concept of FIG. 4, as do several others, culminating in the device of Nasvytis in U.S. Pat. No. 3,365,254 of 1968. Nasvytis eliminated the aforementioned high speed problem of utilizing three series of rollers instead of just two; an even number of roller series having an inherent high-speed problem, an odd number being free of such problem. However, bearings similar to FIG. 4 have the additional problem that it is virtually impossible to manufacture every roller of a series with exactly the same diameter. Hence, those that are slightly larger or smaller than the average will tend to rotate at slightly different speeds, the cumulative effect being either sliding or binding. Equally serious, all rollers in both series are continuously subject to the entire bearing load. Thus a considerable amount of rolling friction occurs between these many elements; whereas in conventional bearings in which loads pass through only one series of rotating elements, only a few balls or rollers at a time are under load.

The radial-load devices of my patent application Ser. No. 414,150 of Nov. 9, 1973 entitled Rolling Contact Bearing Devices U.S. Pat. No. 3,937,536, utilize a concept related to that of device 40, as do several herein later to be described.

Device 50 of FIGS. 5 and 6 is a variation of device 40 which eliminates the relative motion between inner and outer races 41 and 42, thus permitting them to be joined together. In device 50, the peripheral travel-distance of roller 53 is decreased by causing them to roll against a minor diameter of rollers 52. Thus, rollers 53 can be caused to roll around race 51b of cup-ring 51 at the same rate that rollers 52 roll around race 51a. The formula for the dimensions which assure rolling contact only is: $D_1/D_2 = d_1/d_2$; where $D_1$ = diameter of race 51a, $D_2$ = diameter of race 51b, $d_1$ = major diameter of rollers 52, $d_2$ = minor diameter of rollers 52. The diameter of rollers 53 does not enter into this calculation.

The principle of device 50 is applied differently in device 70 of FIG. 7, wherein rollers 72 are in rolling-line contact with outer race 71a of cup-ring 71 and with the major-diameter portion of rollers 73, whose minor diameters are in rolling contact with inner races 71b. The aforementioned formula may be similarly applied to device 70.

Note that in bearings based upon devices 50 and 70, a travel-distance correction is required because the two series of rotating elements contact their respective races at different diameters; whereas in bearings based upon device 30, in which the two series of rotating elements contact their respective races at the same diameter, no such correction is required. Also, if balls are used as rotating elements, they can provide a travel-distance correction by having their major diameter in contact with one race and smaller diameters on their sides in contact with another race; or travel-distance corrections may be ignored, in which event either or both series of rotating balls will simultaneously rotate around more than one axis.

The principle of using stepped-rollers as in devices 50 and 70 to obtain zero speed differential between joined races was used by Westman in U.S. Pat. No. 1,289,062, and was much differently used in my patent application Ser. No. 424,553 of Dec. 13, 1973 entitled Rolling Contact Devices, U.S. Pat. No. 3,969,005.

Looking now at FIG. 8 there will be seen device 80, which is an adaptation of device 70 which has a third race added. In device 80, radial and axial bearing loads are transferred from the third race, outer race 81, through balls 82 to inner V-groove race 83. Retaining race 85 is pressed onto the hub of race 83 and holds balls 84 inbetween balls 82 to prevent their mutual contact. The reduced diameters on balls 82 where they contact race 83 is comparable to the effect of stepped-rollers 73 in device 70.

There will be no sliding contact in device 80 if dimensions are according to the formula $D_3/D_4 = d_3/d_4$; where $D_3$ = diameter of contact upon race 85 by balls 84, $D_4$ = diameter of contact upon race 83 by balls 82, $d_3$ = diameter of the circle on balls 82 where they contact balls 84, $d_4$ = diameter of the circle on balls 82 where they contact race 83.

FIG. 9 represents device 90 which is similar to device 80, except that device 90 is an axial-load bearing. In device 90, bearing loads are transferred from upper race 91 through balls 92 to lower V-groove race 93. Spacing balls 94 are held in position by retaining race 93a. Note that retaining race 93a, balls 94, balls 92, and race 93 of device 90 are similar in operating principle to upper race 31a, rollers 32, rollers 33, and lower race 93 respectively of device 30; however, in device 90 balls are used instead of rollers, and the contact diameter on race 93a is larger than the average of the contact diameters on race 93, which has a V-groove to compensate therefor.

Device 100 of FIG. 10 is a combination radial-load and axial-load rolling-contact roller bearing in which the distance traveled by the spacing balls is increased by having them roll in V-grooves in the load-bearing rollers in compensation for their greater distance from the axis of the bearing. Bearing loads are transferred from outer race 101 through rollers 102 to inner race 103. Retaining balls 104 ride in V-grooves 102a of rollers 102 and are held in position by retaining ring 103a.

FIG. 11 depicts device 111 which is a radial-load rolling-contact bearing. It is a combination of a conventional radial-load bearing and device 40. In FIG. 11, radial bearing loads are transferred from outer race 111 through balls 112 to inner race 113. Small balls 114 are interposed between large balls 112 to provide separation therebetween and are themselves held in position by retaining race 115 and snap ring 116. Note that spacing balls 114 and retaining race 115 carry no load. Note too that retaining race 115 may be used to provide light spring pressure upon spacing balls 114 so as to eliminate internal bearing clearance. It is important to observe that if internal clearances are eliminated by such means, manufacturing tolerances in the diameters of the races and balls will automatically be compensated for. The way this happens is that those balls 112 which are slightly smaller are pushed to the left until they contact both races, there being an adequate coefficient of friction between the balls 112 and the slight curvature of race 111 to preclude bearing loads from forcing balls 112 to the right. Thus all of the balls 112 share the load and a smoother operating bearing results. Other minor effects of such dimensional variations is that the spacing between balls 112 may be slightly different and the balls in both series may have slightly different rotating patterns.

Note that in operating principle, race 115, balls 114, balls 112, and race 113 correspond to race 41, balls 42, balls 43, and race 44 respectively of device 40. However in device 40, races 41 and 44 rotate independently of each other; whereas in device 110, races 113 and 115 are joined together. As was previously mentioned, a travel-distance correction can be avoided because balls 112 and 114 may rotate around more than one axis. For example, balls 112 would normally rotate only around axes parallel to the axis of the bearing, but in device 110 their action against balls 114 may additionally cause them to rotate around axes perpendicular to the axis of the bearing, because balls 112 and 114 contact their respective races at different diameters. Similarly, if balls 112 rotate only around axes parallel to the axis of the bearing, then balls 114 must rotate around more than one axis.

FIG. 12 shows device 120 which is similar to device 110 except that device 120 is an axial-load bearing whereas device 110 accommodates radial loads. In device 120, loads are transferred from upper race 121 through load-carrying balls 122 to lower race 123. Separating balls 124 are held in place by adjustable retaining race 125, which may be used as a means of assembling the bearing and also as means of varying the degree of clearance or pressure within bearing 120. Balls 122 will primarily rotate around axes perpendicular to the axis of the bearing, but since balls 124 are at a slightly greater distance from the axis of the bearing than are balls 122, balls 122 may also be caused to rotate around axes parallel to the axis of bearing 120.

In FIG. 13, device 130 is similar to device 120 and is comprised of upper race 131, load-carrying balls 132, lower race 133, spacing balls 134, and retaining race 133a. Note that the contact diameters of races 133 and 133a are equal, each series of balls thus rotating only around one axis.

In the bearings of FIGS. 8 through 13, all bearing loads are transferred between essentially opposite races through one series of load-carrying rotating elements; the spacing balls and retaining races thus carrying no load. However, in FIGS. 14 and 15 is depicted device 140, in which the spacing balls do carry part of the load. Also, the circles of contact on races 143 and 145 are equal or similar, thus eliminating or minimizing the stepped-roller correction of devices 50 and 70. Bearing loads are transferred from outer race 141 to balls 142, from whence part of the load is transferred directly to race 143, the other part of the load being transferred from balls 142 through balls 144 to race 145. Race 145 is threaded onto race 143 to provide a means of assembling and adjusting the bearing; or, it may be integral with or otherwise fastened to race 143.

In each of the bearings of FIGS. 8 through 15, if a plane is passed perpendicularly through the retaining race and through any point of contact between adjacent balls, the radius of the arc described by the retaining race upon this plane must be smaller than the radius of the circle described upon this same plane by the load-carrying ball. This dimensioning is necessary to assure that the spacing balls do not roll out of the retaining race and between the load-carrying balls.

Note that in devices 80, 90, and 100, the V-grooves prevent the balls from rotating around more than one axis; whereas in devices 110, 120, 130 and 140, the balls are free to rotate around more than one axis and will slightly shift position to accommodate manufacturing tolerances, yet with all elements being in rolling contact only. Note too, that in bearings in which balls are free to rotate around more than one axis at a time, the entire surface of such balls is free to contact the bearing races, thus causing equal use and wear of the entire surface.

Additionally, in devices 130 and 140 the contact diameters on the joined races are about the same, so they are comparable to races 31a and 31b of device 30. Just as the rollers of device 30 may be of various diameters, the spacing balls of devices 130 and 140 could be of various sizes and not affect the rotational pattern of the larger balls. The larger balls should of course be approximately the same size.

I claim:
1. A rolling contact bearing comprising:
   only three bearing races,
   said bearing races being circular and coaxially disposed,
   two of said bearing races being joined to each other,
   only two series of rotating balls,
   said two series of rotating balls each including an equal plurality of balls,
   the balls of the first of said series being alternately interposed between and in rolling contact with the balls of the second of said series,
   said first series of balls being in rolling contact with one of said joined bearing races, said third bearing race, and said second series of balls, each ball of said first series having only four points of contact,
   said second series of balls being in rolling contact with the other of said joined races and with said first series of balls, each ball of said second series having only three points of contact.

2. The rolling contact bearing as claimed in claim 1 in which one of said races is adjustable so as to vary the internal clearance within said bearing.

3. The rolling contact bearing as claimed in claim 1 in which one of said races acts as a retaining spring so as to eliminate internal clearances in said bearing.

4. The rolling contact bearing as claimed in claim 1 in which said rolling contact bearing is a radial load bearing and in which both of said two joined bearing races are located generally radially inwards of said two series of rotating balls.

5. The rolling contact bearing as claimed in claim 1 in which a radial load bearing is described and in which one of said joined bearing races is located radially inwards of said two series of rotating balls and the other of said joined bearing races is located radially outwards of said two series of rotating balls.

6. The rolling contact bearing as claimed in claim 1 in which an axial load bearing is described and in which both of said joined bearing races are located radially outwards of said two series of rotating balls.

7. The rolling contact bearing as claimed in claim 1 in which a combination radial and axial load bearing is described and in which both of said joined bearing races are located radially outwards of said two series of rotating balls.

8. The rolling contact bearing as claimed in claim 1 in which said two races contacted by said first series of balls are on opposite sides of same, so as to cause the entire bearing load to be supported by said first series of balls and none by said second series of balls, which serve principally to provide separation between the balls of said first series.

9. The rolling contact bearing as claimed in claim 1 in which said two races contacted by said first series of balls are other than on opposite sides of same, so that part of the bearing load is supported by said first series of balls and the remainder of the bearing load is supported by said second series of balls.

10. A rolling contact mechanism comprising:

two races,
said two races being circular, coaxial and joined to each other,
two series of rotating balls,
said series each comprising an equal plurality of balls,
said two series of balls being located generally between said two joined races,
the balls of each of said series being alternately interposed between and in rolling contact with the balls of the other of said series and simultaneously being in rolling contact with one of said two joined races,
a third race,
said third race being free to rotate relative to said two joined races and in rolling contact with one of said series of rotating balls, so as to transfer bearing loads therethrough,
said mechanism including only three races and only two series of balls,
there being only rolling contact within said mechanism.

11. The rolling contact mechanism as claimed in claim 8 in which said two joined races have essentially equal contact diameters.

12. The rolling contact mechanism as claimed in claim 8 in which said two joined races have different contact diameters.

* * * * *